Jan. 12, 1965  W. A. GANGUET  3,165,162
MOTORIZED FARM CART
Filed March 11, 1963  3 Sheets-Sheet 1
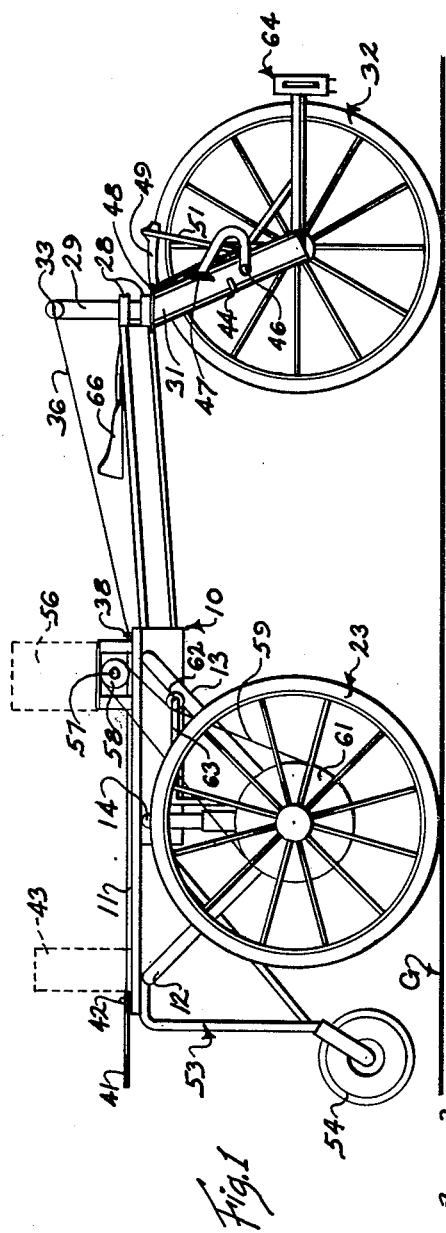
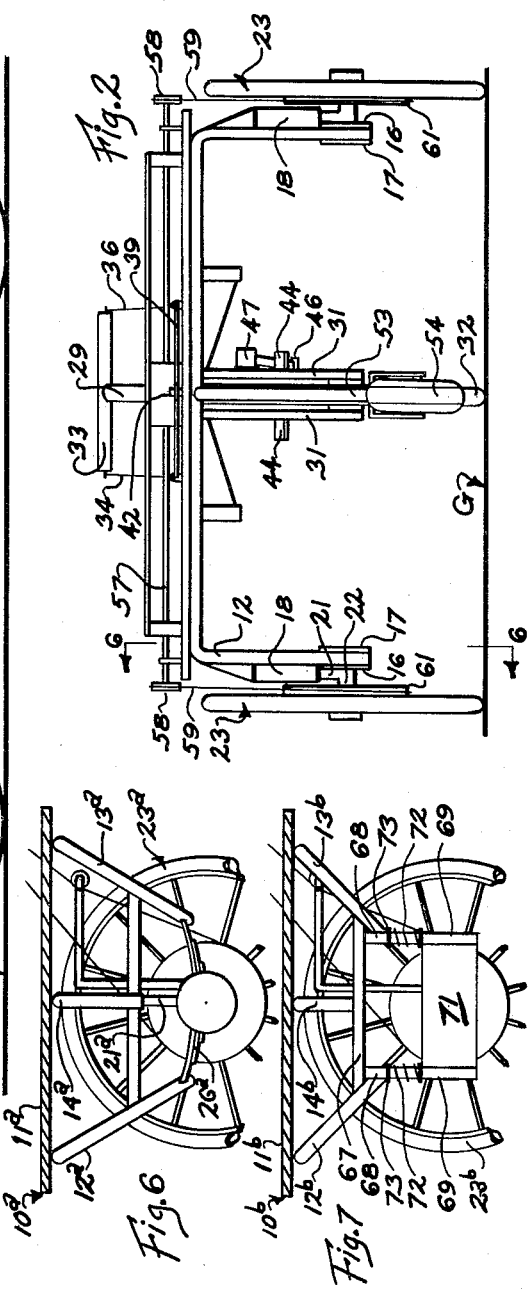
INVENTOR.
William A. Ganguet
BY *Jennings, Carter & Thompson*
Attorneys

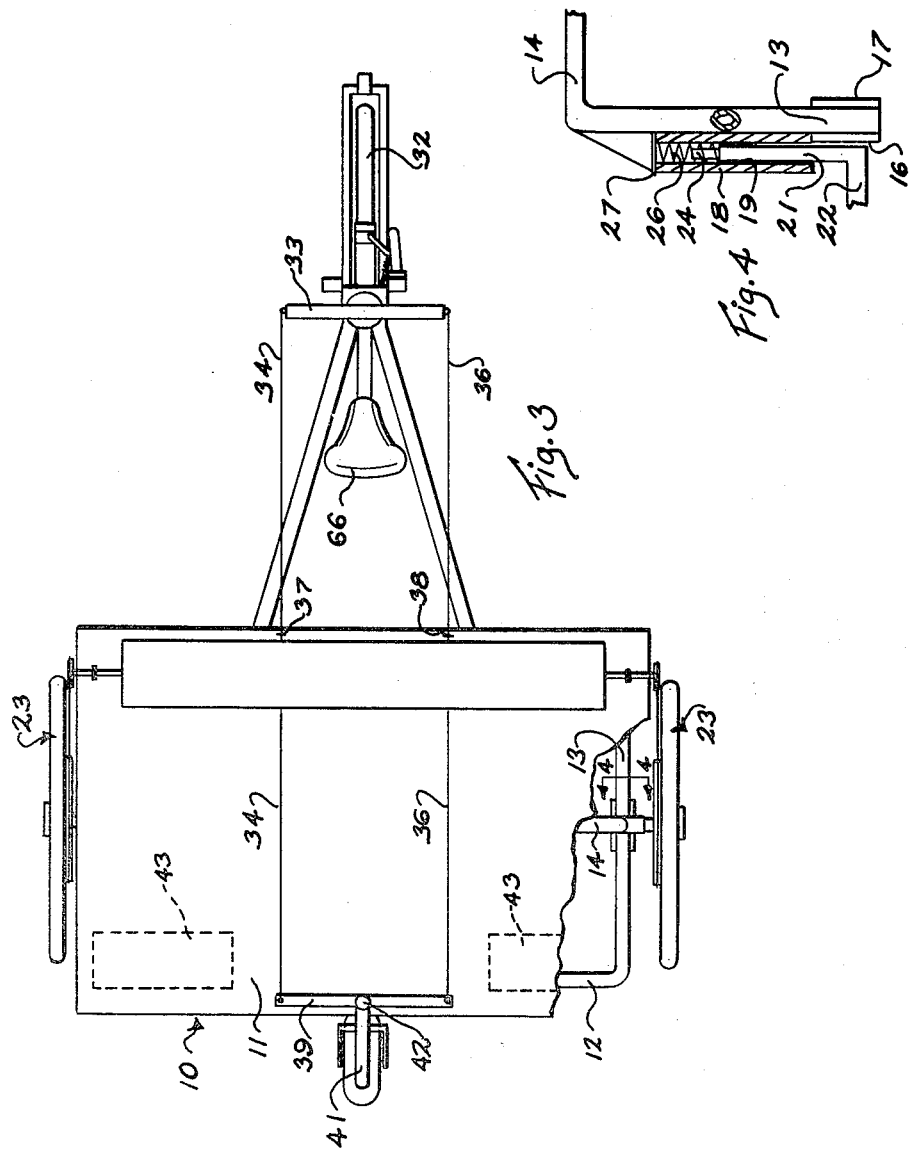

Jan. 12, 1965 W. A. GANGUET 3,165,162
MOTORIZED FARM CART
Filed March 11, 1963 3 Sheets-Sheet 3
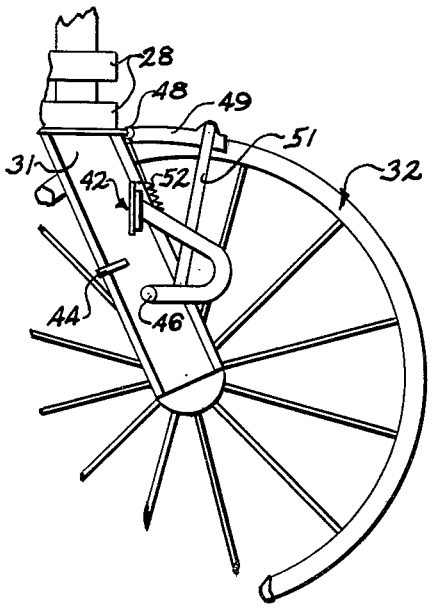
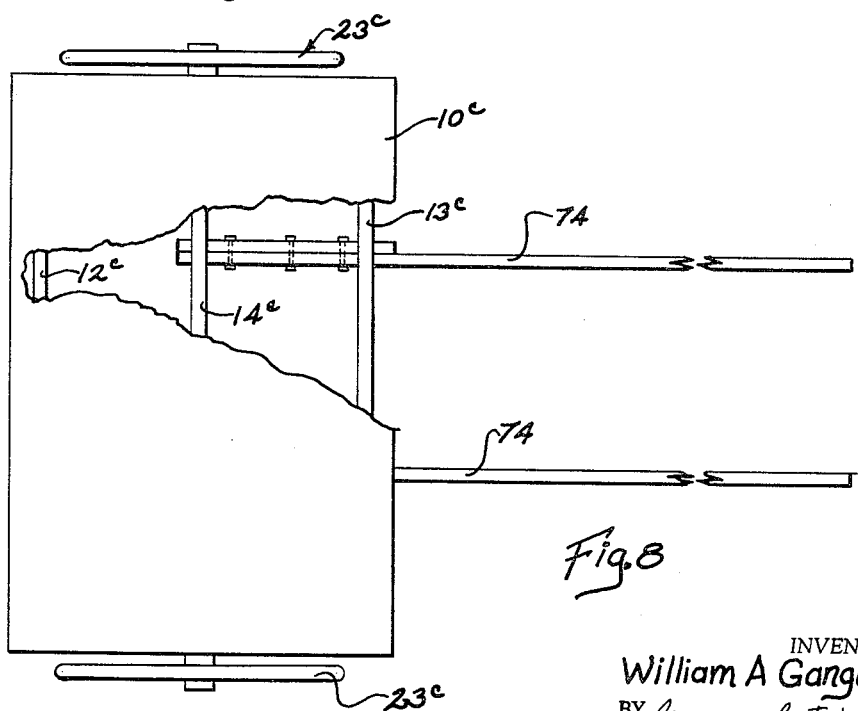
INVENTOR.
William A Ganguet
BY Jennings, Carter & Thompson
Attorneys

United States Patent Office 3,165,162
Patented Jan. 12, 1965

3,165,162
MOTORIZED FARM CART
William A. Ganguet, Cuba, Ala.
Filed Mar. 11, 1963, Ser. No. 264,408
3 Claims. (Cl. 180—27)

This invention relates to a farm cart and more particularly to such a cart which shall be adapted to transport objects over row crops and the like without damage to the vegetation.

An object of my invention is to provide a farm cart of the character designated which shall be adapted for a plurality of uses, such as transporting cotton harvesters, dusting and spraying apparatus, as well as transporting personnel from place to place.

Another object of my invention is to provide a farm cart of the character designated which shall be adapted for high speed operation whereby a maximum amount of ground may be covered by the cart over a given period of time.

A further object of my invention is to provide a farm cart of the character designated which shall be simple of construction, economical of manufacture and one which may be readily changed or modified for a plurality of uses.

Apparatus embodying features of my invention is illustrated in the accompanying drawings, forming a part of this application, in which:

FIG. 1 is a side elevational view of the cart;

FIG. 2 is a rear elevational view thereof;

FIG. 3 is a top plan view, partly broken away;

FIG. 4 is an enlarged fragmental view taken generally along the line 4—4 of FIG. 3, partly broken away and in section;

FIG. 5 is an enlarged fragmental view showing the front wheel of the cart and the brake mechanism associated therewith;

FIG. 6 is a fragmental view taken generally along the line 6—6 of FIG. 2 and showing a modified form of spring supporting means;

FIG. 7 is a fragmental view showing a further modified form of spring supporting means; and, FIG. 8 is a top plan view, partly broken away, showing a still further modified form of my invention.

Referring now to the drawings for a better understanding of my invention, I show a generally horizontal frame 10 having a relatively large flat supporting surface 11 which is adapted to carry large amounts of insecticide dust or spray thereby eliminating frequent trips to the source of supply when the cart is used for dusting or spraying. Secured to and depending from the horizontal frame 10 are generally U-shaped members 12, 13 and 14. As shown in FIG. 1, the base of each U-shaped member is secured to the horizontal frame. The legs of the U-shaped members are relatively long and extend downwardly and inwardly and are rigidly secured in place by disc members 16 and 17 which are positioned at opposite sides of the depending legs, as shown in FIG. 2.

The depending legs of the U-shaped member 14 are also secured to vertical guide members 18, as shown in FIG. 4. Preferably, each of the vertical guide members 18 is provided with a vertically extending passageway or guideway 19 which is square or rectangular, as viewed in cross section. Telescoping upwardly within each of the guide members 18 is an upstanding member 21 which is also square or rectangular whereby it conforms to the inner surface of the guideway 19. Secured to and projecting outwardly from the lower end of each of the upstanding members 21 is a horizontal spindle 22 for supporting a large diameter ground engaging wheel 23 having rubber tires which are relatively narrow as viewed in cross section. By employing a light and strong frame together with large diameter wheels having narrow rubber tires, no shields are required. Accordingly, the wheels are adapted to move between rows of growing plants at approximately three times the speed of conventional carts. That is, where shields are required, the forward speed of the cart is limited greatly due to the large area of contact between the shield and the growing plants. Also my light cart is adapted to move in fields under wet conditions without bogging down. As shown in FIG. 4, the upper end of the upstanding member 21 is reduced in diameter as at 24 for receiving the lower end of a compression spring 26. A suitable spring abutment 27 is carried by the depending leg 14 in position to engage the upper end of spring 26. Preferably, the spring 26 is secured at opposite ends to the upstanding member 21 and the spring abutment 27 whereby the upstanding member 21 does not move outwardly of the guideway 19 upon lifting the frame relative to the wheels 23.

Mounted for pivotal movement in suitable bearings 28 at the forward end of the frame 10 is a vertical shaft 29. Secured to the lower end of the vertical shaft 29 are depending support members 31 which are disposed to extend downwardly alongside and rotatably support a ground engaging wheel 32, as shown. I thus provide a compact unit which is adapted to turn completely around within its own length, thereby permitting the cart to be turned around in fields having narrow head rows or adjacent fences and the like.

Secured to the upper end of the vertical shaft 29 and projecting outwardly from opposite sides thereof is a transverse member 33. Accordingly, upon angular movement of the transverse member 33 in a horizontal plane, the support members 31 move the ground engaging wheel 32 to selected positions to thereby control the direction of movement of the cart. Secured to opposite ends of the transverse member 33 are flexible control members 34 and 36. The control members extend rearwardly beneath suitable guide means 37 and 38 and the rear ends thereof are connected to opposite ends of a transverse member 39 which is formed integrally with a rearwardly extending handle 41. The handle 41 and the transverse member 39 carried thereby are mounted for pivotal movement about a suitable pivot pin 42 whereby upon movement of the handle 41, the control members 34 and 36 move the transverse member 33 to thereby control the direction of movement of the cart. Accordingly, by providing the control handle 41 at the rear of the cart, my improved cart is particularly adapted for use in supporting manually operated cotton harvesters indicated generally at 43. That is, as the cart moves along the cotton rows, the pickers walking rearwardly of the cart are in position to control the direction of movement of the cart with a minimum of effort.

Mounted at opposite sides of the depending support members 31 and projecting outwardly therefrom are foot support members 44, as clearly shown in FIG. 2. Mounted for pivotal movement on a suitable pivot pin 46 at a side of one of the depending supports 31 is a foot pedal 47. As shown in FIGS. 1 and 5, the foot pedal 47 is adjacent one of the foot supports 44 whereby the foot pedal may be actuated with a minimum of effort. Mounted for pivotal movement about a pivot point 48 adjacent the upper ends of the depending supports 31 is one end of a brake shoe 49. The other end of the brake shoe 49 is connected to the foot pedal 47 by a link 51 whereby the brake shoe 49 is pulled toward the periphery of the wheel 32 upon depressing the foot pedal 47. The foot pedal 47 is urged in a counterclockwise direction, as viewed in FIG. 5, by a suitable tension spring 52 whereby the brake shoe 49 is always urged in a direction away from the wheel 32 when the foot pedal 47 is not depressed by the operator.

To prevent the forward end of the cart from moving above a predetermined vertical position, I mount a depending frame 53 adjacent the rear end of the frame 10. Mounted for rotation adjacent the lower end of the depending frame 53 is a caster wheel 54. As shown in FIGS. 1 and 2, the caster wheel 54 is positioned slightly above the ground indicated generally at G whereby it does not engage the ground unless the forward end of the cart is elevated a predetermined distance. By providing the depending frame 53 and the caster wheel 54, I eliminate the possibility of the cart tilting over in a backward direction in the event the load on the cart is unbalanced or in the event the cart is moving up a steep incline.

In FIG. 1 of the drawings, I show the cart as being driven by an internal combustion engine 56 having a drive shaft 57. A suitable sprocket or pulley 58 is mounted on the drive shaft 57 for driving a sprocket chain or belt 59 which in turn passes over a sprocket or pulley 61 operatively connected to the wheels 23. To assure that the sprocket chain 59 is maintained in a tight position at all times, I mount an idler sprocket 62 on a suitable support indicated generally at 63 whereby the idler sprocket 62 moves with the frame 10 to tighten the chain 59 as the wheels 23 are raised relative to the frame and to permit extension of the sprocket chain 59 when the wheels 23 move downwardly away from the frame 10.

As shown in FIG. 1, a suitable hitch 64 is mounted adjacent the forward end of the cart in position to be attached to a tractor or other means for pulling the cart. That is, when it is desired to move the cart at a speed faster than the speed at which the power unit 56 will drive the cart, the cart is attached to a tractor or the like whereby the cart may be transferred from one field to another along a highway or the like. A suitable seat 66 is mounted on the frame 10 rearwardly of the vertical shaft 29, as shown, whereby the operator is in position to actuate the brake pedal 47. Also, while the operator is riding in this position, the cart may be steered by moving the transverse member 33 instead of actuating the handle 41.

Referring now to FIG. 6 of the drawings, I show a horizontal frame 10$^a$ having a relatively flat supporting surface 11$^a$ and generally U-shaped support members 12$^a$, 13$^a$ and 14$^a$. The depending legs 12$^a$ and 13$^a$ extend downardly and inwardly to a position adjacent the central portion of the ground engaging wheels indicated generally at 23$^a$. Secured to the supporting spindle for the ground engaging wheels 23$^a$ is a leaf spring 26$^a$ having opposite ends thereof connected to the lower ends of the depending legs of the frame members 12$^a$ and 13$^a$, as shown. The depending legs of the intermediate U-shaped frame member 14$^a$ is preferably tubular in shape whereby it is adapted to receive the upper end of a vertical member 21$^a$. Accordingly, the members 21$^a$ and 14$^a$ telescope relative to each other to permit the wheels 23$^a$ to move relative to the frame 10$^a$.

Referring now to FIG. 7 of the drawings, I show another modified form of my invention in which a horizontal frame 10$^b$ having a relatively flat supporting surface 11$^b$ is supported by depending U-shaped frame members 12$^b$, 13$^b$ and 14$^b$. The legs of the U-shaped frame members are connected to each other by a transverse member 67. Secured to the legs of the U-shaped frame members and the transverse member 67 and depending therefrom are vertical members 68. The lower ends of the vertical members 68 telescope into cylindrical guide members 69 which are provided at opposite ends of a transverse support member 71. The ground engaging wheels 23$^b$ for the frame 10$^b$ are carried by the transverse frame members 71 whereby they are adapted to move therewith. Surrounding each of the vertical members 68 above the tubular guide member 69 is a compression spring 72. The upper end of the compression spring 72 engages suitable spring abutments 73 carried by the vertical members 68 whereby the transverse members 71 are urged downwardly away from the frame 10$^b$. The operation of the apparatus shown in FIGS. 6 and 7 is substantially identical to the operation of the apparatus shown in FIGS. 1–5.

Referring now to FIG. 8 of the drawings, I show another modified form of my invention in which a horizontal frame 10$^c$ is supported by generally U-shaped frame members 12$^c$, 13$^c$ and 14$^c$. The depending legs of the U-shaped members 12$^c$, 13$^c$ and 14$^c$ are operatively connected to and support a pair of ground engaging wheels 23$^c$ in the manner described hereinabove. Instead of employing an internal combustion engine to propel the part shown in FIG. 8, forwardly extending shafts 74 are secured to the frame 10$^c$ as shown. In all other respects, the operation of the apparatus shown in FIG. 8 is substantially identical to the operation of the apparatus shown in FIGS. 1–7.

From the foregoing, it will be seen that I have devised an improved farm cart which is adapted for a plurality of uses, such as transporting cotton harvesters, dusting and spraying apparatus or any other apparatus employed to treat or harvest crops or the like. Also, by providing a farm cart having a horizontal frame which is supported at a substantial elevation above the ground, my improved cart is particularly adapted for use with row crops and for transporting articles over any obstacles or vegetation which is at a lower elevation than the elevation of the supporting frame. Also, by providing generally U-shaped frame members for supporting the horizontal frame, the cart may be formed of a minimum of materials and yet provide the required strength. Also, by rigidly securing the disc-like members 16 and 17 to opposite sides of the depending legs of the U-shaped frame members, the wheel spindles are held in proper alignment relative to the frame. Furthermore, by providing a depending frame adjacent the rear of the apparatus which is in position to engage the ground when the forward end of the cart is elevated above a predetermined position, the cart cannot tilt backwardly beyond a predetermined position. By providing the transverse control member 33 and the rearwardly extending handle 41 at the rear end of the cart, the cart may be controlled either by an operator riding the cart or by a person walking rearwardly thereof.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. A farm cart adapted to transport objects over a row crop and the like comprising:
   (a) a generally horizontal frame for supporting said objects,
   (b) at least one pair of generally U-shaped members extending transversely of said frame and having the bases thereof secured to said frame in spaced relation to each other adjacent one end of said frame with the legs thereof depending therefrom,
   (c) disc-like members securing the lower end portions of the legs of said U-shaped members to each other,
   (d) a spindle on each side of the vehicle operatively connected to said legs adjacent said disc-like members and projecting outwardly from said legs,
   (e) a large diameter ground engaging wheel mounted on each spindle in position to support said one end of the frame at an elevation above said crop,
   (f) another large diameter ground engaging wheel mounted for pivotal movement adjacent the other end of said frame in position to support said other end of the frame at an elevation above said crop,
   (g) a power unit carried by said supporting frame,
   (h) means operatively connecting said power unit to said pair of ground engaging wheels to drive the same, (i) steering means operatively connected to said another ground engaging wheel to pivot said another wheel relative to said frame, (j) resilient means interposed between said spindles and said legs to permit a limited amount of relative movement therebetween, and (k) a depending member carried by the end of said frame supported by said pair of ground engaging wheels disposed to engage the ground upon a predetermined amount of vertical movement of the other end of said frame.

2. A farm cart as defined in claim 1 in which the resilient means interposed between said spindles and said legs comprises:

(a) an upstanding member operatively connected to each spindle, (b) a guide member carried by said legs in position to receive said upstanding member with a sliding fit, (c) a compression spring having one end therein in contact with the upper end of said upstanding member, and (d) a spring abutment disposed to engage the other end of said spring and limit upward movement thereof whereby said upstanding member and the spindle carried thereby are adapted for a limited amount of vertical movement relative to said legs.

3. A farm cart as defined in claim 1 in which said disc-like members are secured rigidly to opposite sides of said legs of the U-shaped members.

References Cited in the file of this patent
UNITED STATES PATENTS

| | | |
|---|---|---|
| 507,412 | Broadbent | Oct. 24, 1893 |
| 539,013 | Wright | May 7, 1895 |
| 637,350 | Rowlands | Nov. 21, 1899 |
| 643,728 | Payne | Feb. 20, 1900 |
| 1,449,137 | Bartholomew | Mar. 20, 1923 |
| 1,889,580 | Willet et al. | Mar. 20, 1923 |
| 2,464,326 | MacGregor | Mar. 15, 1949 |
| 2,563,370 | Reese | Aug. 7, 1951 |
| 2,744,582 | Sheppard | May 8, 1956 |
| 2,805,075 | Fladung | Sept. 3, 1957 |
| 2,851,179 | Vance | Sept. 9, 1958 |